US011080145B1

(12) United States Patent
Andreyev

(10) Patent No.: US 11,080,145 B1
(45) Date of Patent: Aug. 3, 2021

(54) DICTIONARY SYNCHRONIZATION OVER A TRANSPORT WITH GUARANTEED ORDERING

(71) Applicant: EMC IP Holding Company LLC, Hopkinton, MA (US)

(72) Inventor: Ivan Andreyev, St. Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 32 days.

(21) Appl. No.: 15/782,055

(22) Filed: Oct. 12, 2017

(51) Int. Cl.
*G06F 11/14* (2006.01)
*G06F 3/06* (2006.01)
*G06F 16/174* (2019.01)
*G06F 40/242* (2020.01)

(52) U.S. Cl.
CPC ........ *G06F 11/1453* (2013.01); *G06F 3/0608* (2013.01); *G06F 3/0641* (2013.01); *G06F 3/0668* (2013.01); *G06F 11/1464* (2013.01); *G06F 16/1752* (2019.01); *G06F 40/242* (2020.01)

(58) Field of Classification Search
CPC ............ G06F 11/1453; G06F 16/1752; G06F 3/0608; G06F 3/0641; G06F 3/0668; G06F 11/1464; G06F 17/2735
See application file for complete search history.

(56) References Cited

U.S. PATENT DOCUMENTS

| 2007/0124415 | A1* | 5/2007 | Lev-Ran | ............... H04L 51/063 709/217 |
| 2017/0185326 | A1* | 6/2017 | Meiri | ..................... G06F 3/0619 |
| 2018/0218005 | A1* | 8/2018 | Kuhtz | ....................... G06F 8/44 |

* cited by examiner

*Primary Examiner* — Eric Cardwell
(74) *Attorney, Agent, or Firm* — Workman Nydegger

(57) ABSTRACT

Systems and methods of dictionary synchronization between applications over a network are provided. The dictionary synchronization can be performed with guaranteed packet ordering. With guaranteed packet ordering, operations such as data de-duplication can be performed over the wire or network.

16 Claims, 4 Drawing Sheets

DICTIONARY SYNCHRONIZATION OVER A TRANSPORT WITH GUARANTEED ORDERING

FIELD OF THE INVENTION

Embodiments of the present invention relate to systems and methods for synchronizing applications over a network. More specifically, embodiments of the invention relate to dictionary synchronization between two applications over a network using a packet transport with guaranteed packet ordering.

BACKGROUND

In modern computing systems, data is often transmitted from one application to another application or from a client to a server or from a server to a client. In some applications, the transport of data can consume significant bandwidth and time and is not inconsequential.

Further, there are situations where it is useful to transmit data in a manner that guarantees packet ordering. Network transport like TCP (Transmission Control Protocol)—transport with guaranteed ordering—usually does not provide enough network throughput and a common solution is to use Parallel TCP—multiple parallel TCP streams to increase throughput. However, Parallel TCP does not guarantee packet ordering. As a result, complex duplex communication is needed in order transmit/receive data successfully. Systems and methods are needed to improve communication and data transport between applications.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
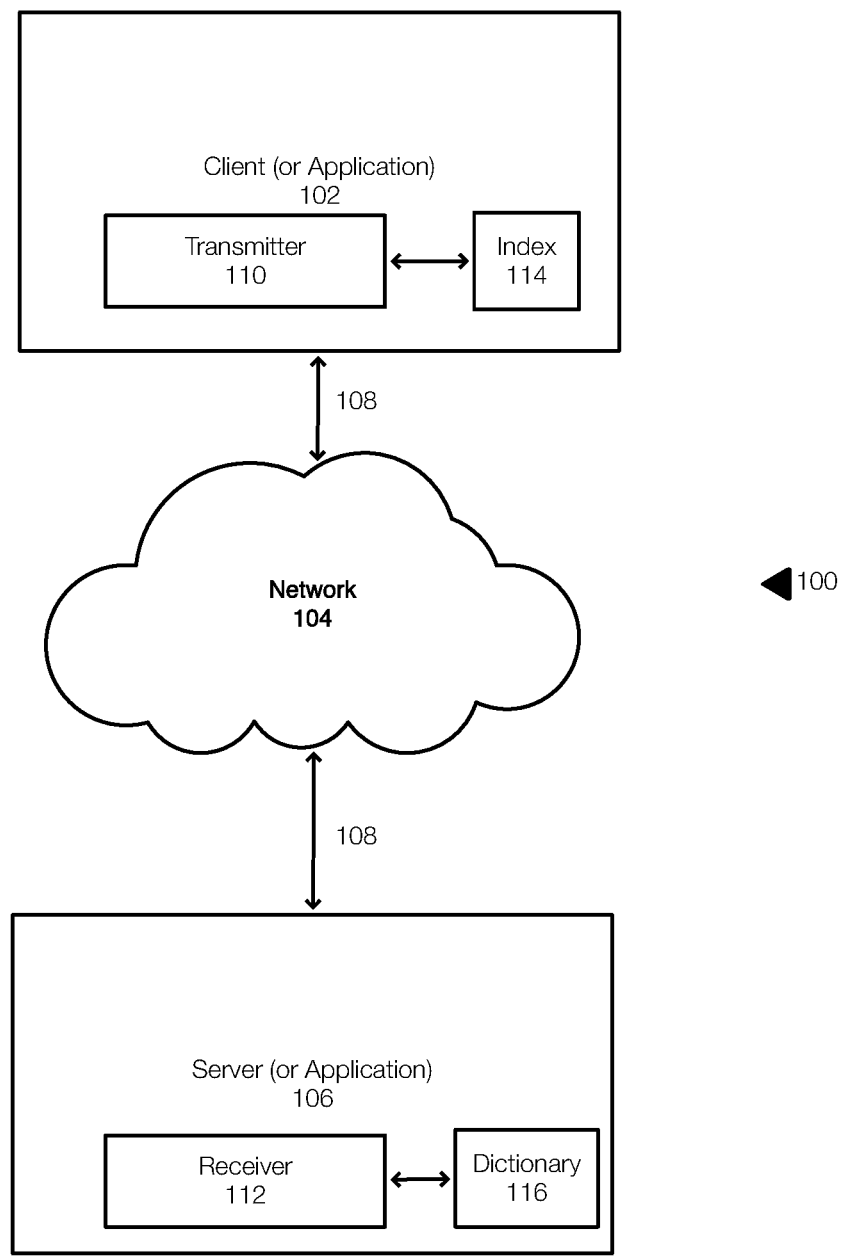
FIG. 1 illustrates an example of a computing system that provides dictionary synchronization over a network.

Embodiments of the invention relate to systems and methods for protecting data. More particularly, embodiments of the invention relate to systems and methods for synchronizing data transported between two applications using a packet transport with guaranteed packet ordering. Embodiments of the invention facilitate, by way of example, data de-duplication, data compression, data protection operations, or the like over the wire or over the network. Embodiments of the invention can converse transport bandwidth at least by not sending chunks that are already known to the intended recipient.

More generally, embodiments of the invention relate to methods (and systems) of dictionary synchronization between applications using a packet transport with guaranteed packet ordering. The systems and methods may be used to perform data deduplication over the wire (or compression with dictionary synchronization over the wire). In one example, a pair of applications may establish communication over a network. One of the applications may be referred to as a transmitter and the other application may be referred to as a receiver.

In the context of a backup operation, for example, a client (e.g., a transmitter may include software and hardware for transmitting data (e.g., chunks) to a server (e.g., a receiver). The receiver may be configured to store the transmitted data or chunks in a target storage device.

Embodiments of the invention relate to communications between the transmitter (e.g., the client or agent) and the receiver (e.g., the backup or data protection server). The transmission of data is achieved using components that are maintained, respectively, by the transmitter and the receiver.

For example, the transmitter may maintain an index (e.g., a transmitter cache) and the receiver may maintain a dictionary (e.g., a data cache). The index and the dictionary may be maintained in a cache or in other memory. The index contains information about data chunks that are known to the receiver (i.e., data chunks that have already been sent to the receiver). The information in the index may include an address (e.g., an offset) of the data chunk in the dictionary maintained by the receiver. The dictionary, on the receiver side, contains chunks of data. Each data chunk has a unique assigned address.

In one example, a digest (e.g., sha-1, sha-2) of the data chunk may be used as a key into the index. Thus, the transmitter can generate a digest of a data chunk to determine whether the chunk is known to the receiver. When the chunk is present in the index, the actual data does not need to be transmitted (thus conserving transport bandwidth). This allows the data to also be de-duplicated because the chunk is already known to the receiver.

When transporting data or chunks, an incoming data chunk on the transmitter side is checked against the index to see if the data chunk is known to the receiver or not. If the data chunk is known to the receiver (i.e., already stored in the dictionary), the address of the data chunk is sent to the receiver. A known chunk does not need to be sent to the receiver.

If the data chunk is not known to the receiver, the data chunk is sent as is and the receiver adds this data chunk to the dictionary and assigns an address to the data chunk. Then, the address assigned to the data chunk is sent back to the transmitter to be added to the index. The chunk thus becomes known. Alternatively, the transmitter can determine the address independently of the receiver such that it is not necessary for the receiver to report the address to the transmitter.

Because memory is not generally unlimited, data chunks that are known, but that have not been seen in an incoming data stream become stale. Embodiments of the invention may evict stale data from the index and from the dictionary. This frees storage for newer chunks.

More specifically, the transmitter may receive a data chunk from an application. The transmitter then determines whether the data chunk is already present on the receiver by checking the index. If the receiver already has the data chunk, the address of the data chunk (not the full data chunk) is put into a transport sending queue. If the receiver does not have the data chunk (based on information in the index), then the full data chunk is placed into the transport sending queue.

The receiver generally receives a packet from the transport mechanism. If the packet or packets includes a full data chunk, the chunk is entered into the dictionary, an address is assigned, and the dictionary address of the data chunk is communicated to the transmitter. The data chunk may then be passed, by the receiver, to an application.

Embodiments of the invention use network transport that provides guaranteed ordering. If packet ordering is not guaranteed, this may incur data races between the index on the transmitter and the dictionary on the receiver due in part to the different latencies in different TCP streams. As previously stated, complex duplex communication would then be needed in order to send the chunk address back to the transmitter. This process is further complicated when implementing eviction processes from the index and dictionary. U.S. Pat. No. 8,495,304, incorporated herein by reference, sets forth a network transport with guaranteed ordering.

Using a network transport that fully utilize network bandwidth while preserving packet ordering allows for robust dictionary synchronization algorithms, which are disclosed herein.

Embodiments of the invention may be implemented, by way of example, with transports that guaranteed packet ordering. Further, embodiments of the invention do not require duplex communication, which reduces network overhead.

In some embodiments, the dictionary uses a memory/storage allocation algorithm that produces virtual addresses to store the data chunks. When the dictionary is constrained (e.g., RAM, disk storage), the receiver may identify data chunks for eviction from the dictionary. Thus, the receiver, in addition to generating addresses for the new data chunks, also determines or identifies data chunks that should be evicted from the dictionary (e.g., based on LRU (Least Recently Used), etc.) and outputs eviction addresses. In one example, the transmitter may similarly evict data from the index.

Embodiments of the invention remove duplex communication during dictionary address synchronization. In one example, duplex communication is removed because newly assigned chunk addresses to not need to be communicated between the receiver and the transmitter. Rather, the chunk address determined by the receiver is also calculated by the transmitter as well. By deterministically computing the chunk address, the address calculated on the transmitter is the same as the address calculated on the receiver and the duplex communication needed to convey the address is eliminated.

To achieve this, a deterministic allocation algorithm is used. When a deterministic allocation algorithm is initialized with the same parameters both on transmitter and the receiver, and the packet ordering between transmitter and receiver is guaranteed, the algorithm will produce exactly the same output. As a result, the index and the dictionary can be synchronized while minimizing overhead communications such as duplex communications and without, in some examples, transmitting the chunks themselves.

For any new data chunk that is not known to the receiver, the transmitter will calculate the dictionary address and place the address in the index. The receiver will calculate an address that is exactly the same and add the data chunk to the dictionary at the calculated address.

The allocation algorithm used to determine the address can vary. However, the addresses calculated at the receiver and the transmitter should be the same, thus a deterministic algorithm is preferred. The algorithm choice can be based on the nature of application data chunks. For example, for fixed size data chunks, a buddy allocator or free-list allocator can be chosen. While there is an overhead for keeping track of address allocation on the transmitter, the overhead is very small compared to the amount of data stored in the dictionary.

FIG. 1 illustrates an example of a computing system 100 for implementing systems and methods of dictionary synchronization over a transport. FIG. 1 illustrates a client (or application) 102 that may communicate with a server (or application) 106 over a network 104. The communication is achieved according to a transport 108 that guarantees packet ordering. Guaranteed packet ordering, in one example, helps ensure that the addresses are computed at the receiver and the transmitter in a deterministic manner.

The client 102 may be associated with a transmitter 110 and the server 106 may be associated with a receiver 112. The client 102 may generate a data stream for transmission to the server 102. The transmitter 110 may be configured to process and transmit the data stream. When transporting a data stream, the data stream may be broken into data chunks that are encapsulated in packets.

Prior to transmitting the data chunks over the transport 108 (over the network 104), the transmitter 110 may consult an index 114 to determine whether the data chunk is already known to the receiver 112. If the chunk is known to the receiver 112, only the address of the chunk need be transmitted by the transmitter. By transmitting the address of the chunk, the receiver can access and deliver the corresponding chunk from a dictionary to the server 106.

When a new chunk that is not known to the receiver 112 is being transmitted, the transmitter 110 determines the address of the chunk and inserts the address into the index 114. The receiver 112 is associated with a dictionary 116 (e.g., a cache) that stores data chunks. The receiver 112 deterministically calculates the address of the new chunk and inserts the new chunk into the dictionary 116.

In the context of two applications, this allows the data to be de-duplicated and allows the transmitting application to deliver a data chunk to a receiving application without having to actually transmit the data chunk. In other words, when the chunk is already known to the receiver, transmitting the address of the known data chunk allows the receiving application to have access to the chunk using the copy of the chunk stored in the dictionary. This preserves bandwidth, removes duplex communication, and saves computing resources.

Figure 2:
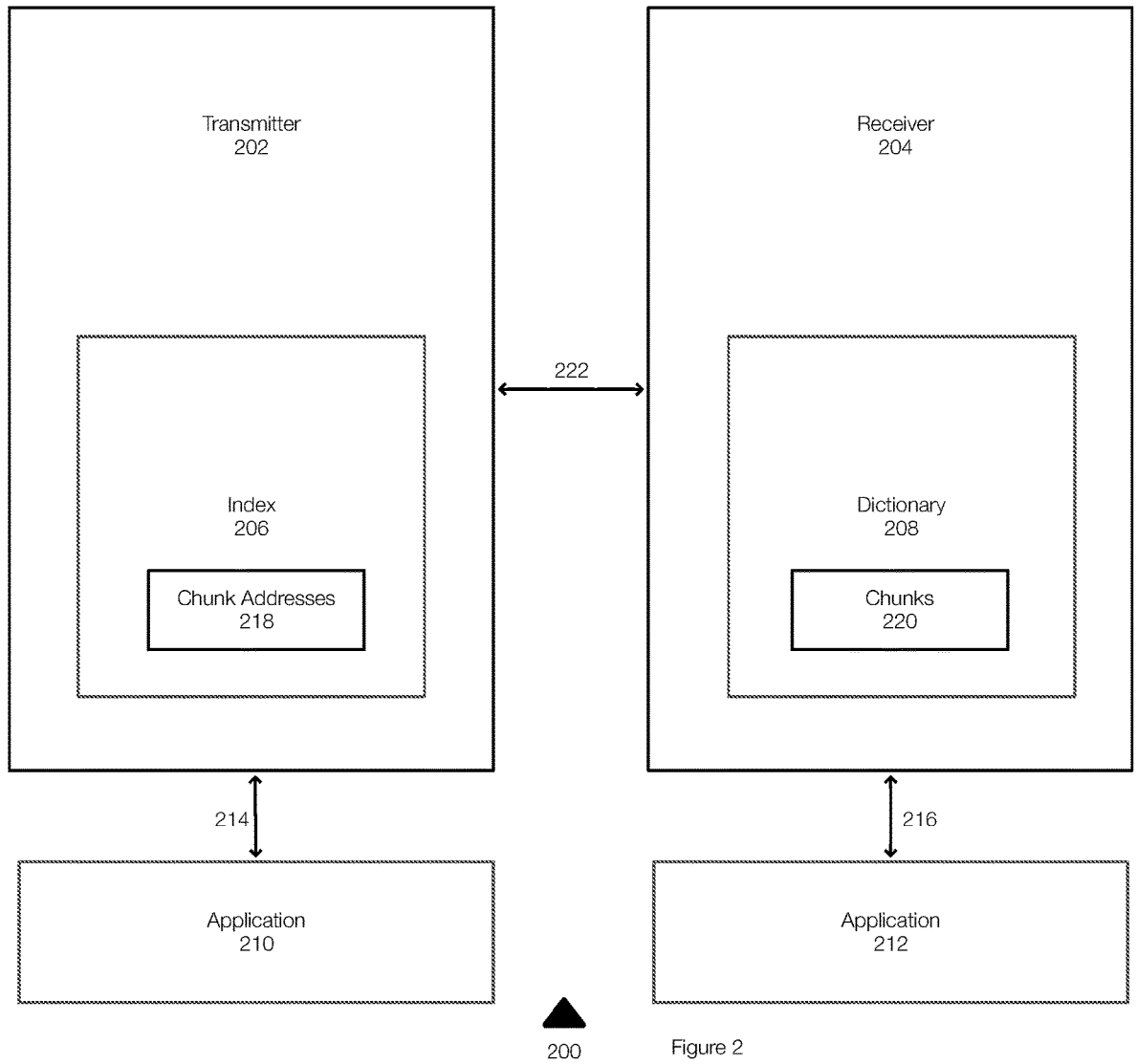
FIG. 2 illustrates an example of a computing system that provides dictionary synchronization over a network over a transport with guaranteed ordering.

FIG. 2 illustrates another example of a computing system 200 for dictionary synchronization with guaranteed packet ordering. FIG. 2 illustrates applications 210 and 212 that work together. For example, the application 210 may be a backup client operating on a node or a client device and the application 212 may be a backup server that receives data from the application 210. Thus, the application 210 may generate a data stream that is transmitted by a transmitter 202 (which may be part of the application 210) to a receiver 204 (which may be part of the application 212). The applications 210 and 212 may be related (e.g., part of the same data protection system for performing backup related operations (e.g., backup, de-duplicate, compress, restore, archive, etc.).

FIG. 2 illustrates that the data transmitted between the transmitter 202 to the receiver 204 over a network using a transport 222 can be achieved in a manner that de-duplicates the data being transmitted. The transport 222 guarantees packet ordering, even when the transport 222 is a multipath transport.

In FIG. 2, the chunk addresses 218 identifies the addresses (or other identifier) of chunks that are known to the receiver 204 and that are already stored in the chunks 220 of the dictionary 208. The index may also store copies of the chunks known to the receiver.

When transporting a data stream, the transmitter 202 receives a chunk from the application 210 and determines whether the chunk is represented in the chunk addresses 218. This may be achieved by hashing the chunk or generating a digest of the chunk. In one example, the digest or hash represents an address of the chunk. If the address of the chunk is in the chunk addresses 218 is present in the chunk addresses 218, then the chunk is known to the receiver 204 and is already stored in the chunks 220 kept in the dictionary 208. By providing the receiver 204 with the address of the chunk, the receiver can access the dictionary 208 to retrieve the chunk from the chunks 220 and then deliver the chunk to the application 212. In this manner, the data stream is effectively de-duplicated.

Figure 3:
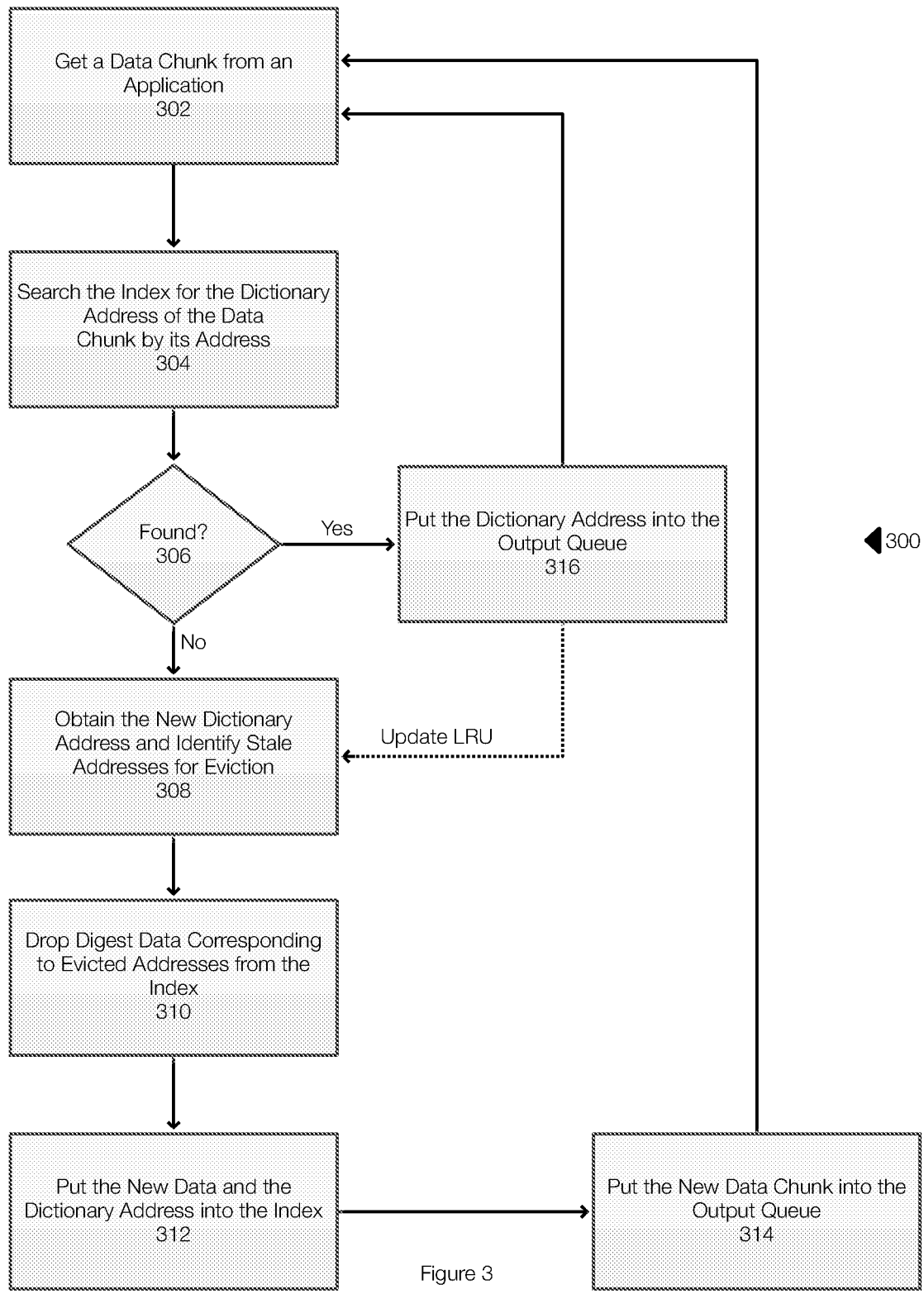
FIG. 3 illustrates an example of a method for transmitting data over a network with dictionary synchronization.

FIG. 3 illustrates an example of a method 300 for transmitting data chunks from a transmitter to a receiver. The method 300 illustrates steps or acts performed by the transmitter or on the transmitter side of the network transport.

Initially, a data chunk is received 302 from an application. The data chunk may be part of a data stream. The transmitter may also chunk the data. After receiving the chunk, the index is searched 304 for the dictionary address of the chunk. The index may be searched by determining the address and then determining if the address is present in the index. In one example, the transmitter may determine the address of the chunk in a deterministic manner. When the address is found 306 in the index, the address, which is also the dictionary address, is placed 316 in an output queue for transmission to the receiver. The index may be updated as well to reflect that the chunk has been used or transmitted recently. This is used, for example, when evicting stale data from the index. A recently used chunk or a new chunk is less likely to be evicted than chunks that have not been accessed or seen for some period of time. Thus, the chunk itself, when found in the index or when the address of the chunk is found in the index, is thus known to the receiver. In this case, the known chunk is not placed in the output transport queue.

In one example, the transmitter and the dictionary may coordinate such that the same chunks are evicted. However, this is optional. Further, the sizes of the index and the dictionary may not be the same. In addition, the dictionary may be configured to communicate with multiple clients or with multiple indexes. Thus, the dictionary may include chunks that were sent by one transmitter but not another. Alternatively, the dictionary can be maintained in a manner that is specific to an individual client.

When the address is not found 316 in the index, stale addresses in the index may also be identified for eviction at this time, using a cache eviction strategy for example. The addresses (e.g., the digests or hashes) of stale chunks may be removed or dropped 310 from the index during this process of transmitting data. The eviction of addresses from the index can be performed as needed and it may not be necessary to evict an address from the index each time an address is added to the index. The eviction process can use a variety of criteria when determining whether to evict addresses. Cache eviction strategies, by way of example and not limitation, include least recently used, random, least frequently used with aging, or the like.

When the address is not found 316 in the index, the dictionary address of the chunk is determined and placed into the index 312. The chunk may also be placed 312 into the index. The address of the chunk generated at the transmitter is generated deterministically so that the receiver can generate the same address or digest. This ensures that the transmitter can know that the chunk is known to the receiver without communicating with the receiver regarding that chunk.

The new chunk is then placed 314 in the output queue for transmission to the receiver. The transmitter then repeats the process with the next chunk. This process may continue until all chunks have been processed.

Figure 4:
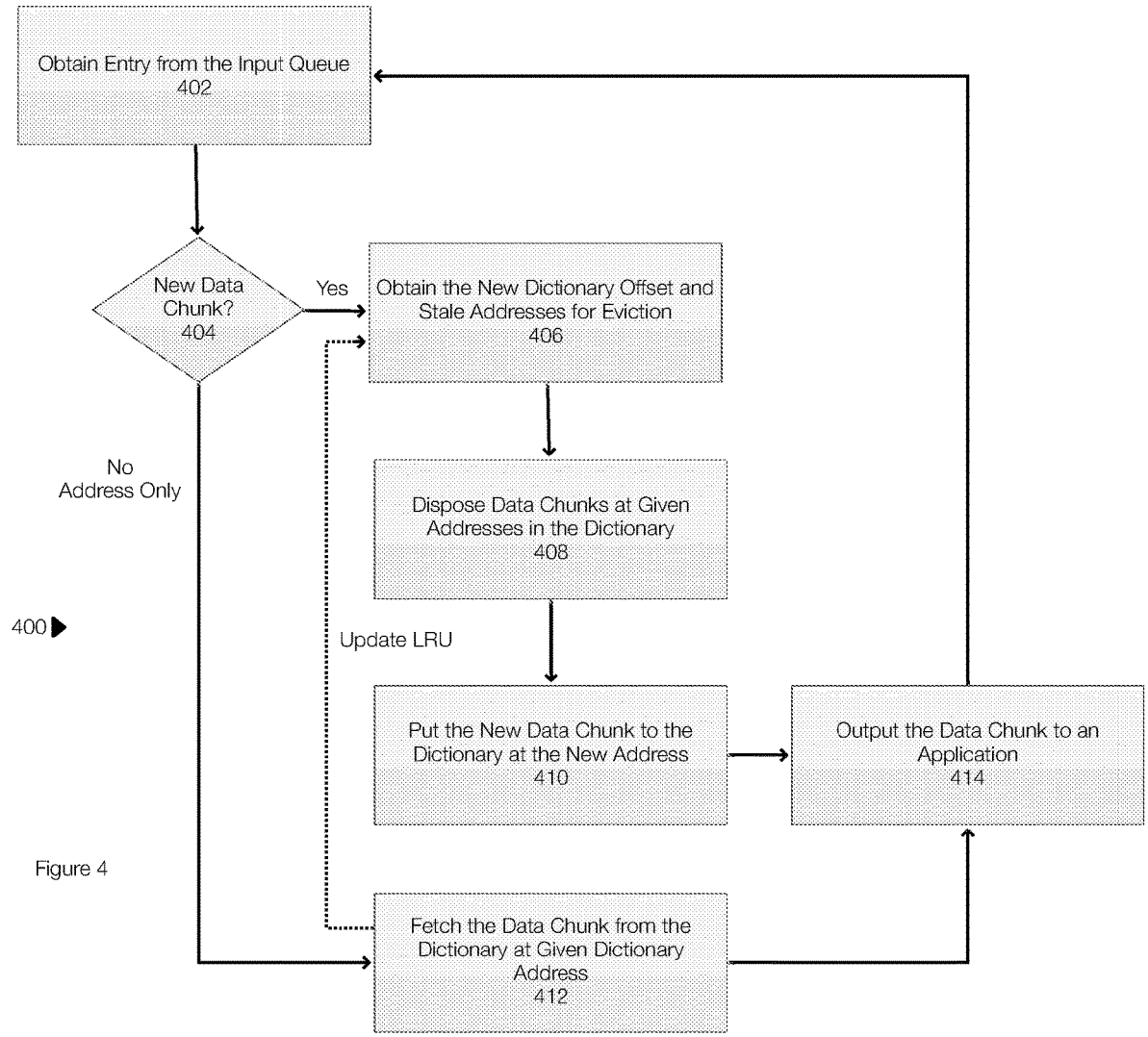
FIG. 4 illustrates an example of a method for receiving data over a network with dictionary synchronization.

FIG. 4 illustrates an example of a method 400 for receiving a data stream from a transmitter. FIG. 4 illustrates dictionary synchronization over a transport with guaranteed ordering from the perspective of the receiver.

When communication occurs between the transmitter and the receiver, the transmitter may be associated with an output queue or an output transport queue and the receiver is associated with an input queue or an input transport queue. Thus, the client obtains 402 an entry from the input queue. When the entry is a new data chunk 404, the dictionary offset for the new chunk and/or stale addresses for eviction are obtained 406. The receiver may perform the same process on the new data chunk such that the address or digest computed by the receiver is the same as the address or digest computed by the transmitter. This ensures that the information stored in the index accurately reflects the chunks stored in the dictionary and allows the transmitter to determine whether a particular chunk is known to the receiver.

After deterministically computing the digest or address, the new data chunk is placed or disposed 408 at the determined address in the dictionary. The receiver may then put 410 the new data chunk to the dictionary at the new address. The data chunk is then output 424 to an application.

If the entry from the input queue contains only an address and not a new data chunk (No at decision 404), then the data chunk disposed at the address included in the entry retrieved from the input queue is used to fetch 412 the data chunk from the dictionary. The address transmitted by the transmitter identifies the chunk in the dictionary. After retrieving the chunk from the dictionary, the retrieved or fetched chunk is output 414 to an application. When fetching the data chunk from the dictionary using the address in the entry from the input queue, the dictionary may be updated (e.g., update LRU) for eviction purposes.

This process then repeats by processing the next entry in the input queue until all entries are processed.

In one example, it may be possible for the dictionary to contain a chunk that is not reflected in the index of the transmitter. When the transmitter sends a chunk that is known to the receiver, the receiver may disregard the chunk, ensure that the chunks are the same by performing a digest, or the like. Because the index and the dictionary may be different sizes, the eviction policies may differ.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for transporting chunks over a transport using guaranteed ordering, the method comprising:
    storing an index on a transmitter side and storing a dictionary on a receiver side;
    receiving a chunk for transmission from a transmitter to a receiver;
    accessing the index to determine whether the chunk is known to the receiver;
    when the chunk is known to the receiver:
        transmitting the address of the chunk to the receiver without transmitting the chunk;
        updating the index to reflect that the chunk has been used recently and is not stale for eviction purposes, wherein the receiver receives the address and updates the dictionary for eviction purposes;
        evicting stale entries in the index by the transmitter; and
        evicting stale entries in the dictionary by the receiver;
    when the chunk is not known to the receiver:
        deterministically determining by the transmitter, when the chunk is not known to the receiver, an address of the chunk;
        storing the address in the index;
        updating the index to reflect that the chunk is not stale for eviction purposes;
        evicting stale entries in the index by the transmitter;
        transmitting the chunk that is not known to the receiver to the receiver without conveying the address of the chunk over the transport;
        deterministically determining a dictionary address of the chunk by the receiver;
        storing the chunk in the dictionary at the deterministically determined dictionary address, wherein the dictionary address is the same as the address in the index; and
        updating the dictionary by the receiver to reflect that the chunk is not stale for eviction purposes; and
        evicting stale entries in the dictionary by the receiver.

2. The method of claim 1, further comprising:
    accessing the index based on the determined address; and
    determining that the chunk is known to the receiver when the determined address is present in the index.

3. The method of claim 1, further comprising transmitting only the address of the chunk when determining that the chunk is known to the receiver.

4. The method of claim 1, further comprising transmitting the chunk or the address to the receiver with guaranteed packet ordering.

5. The method of claim 1, further comprising deterministically determining the dictionary address of the chunk such that the address calculated by the transmitter is the same as the dictionary address calculated by the receiver.

6. The method of claim 1, further comprising entering the address into the index and into the dictionary without requiring the receiver to transmit the address to the transmitter.

7. The method of claim 1, further comprising evicting the stale entries from the index and/or from the dictionary according to a predetermined strategy, wherein the index comprises a cache memory or other memory and wherein the dictionary comprises a cache memory or other memory.

8. The method of claim 1, further comprising, when only the address of the chunk is transmitted by the transmitter, accessing the dictionary to retrieve the chunk at the address and providing the chunk to an application on the receiver side.

9. A method for a transmitter and a receiver to transmit data between a first application and a second application using guaranteed ordering, wherein the transmitter is associated with an index and the receiver is associated with a dictionary, the method comprising:
   transmitting, for each data chunk processed by the transmitter, either the data chunk itself or its address to the receiver;
   updating the index, for each data chunk or address transmitted to the receiver, for eviction purposes;
   receiving the data chunks or addresses of data chunks as entries in an input queue at the receiver;
   accessing the input queue to obtain an entry;
   determining that the entry contains a new data chunk from the first application;
   calculating a dictionary address, by the receiver, for the new data chunk;
   updating the dictionary at the transmitter with the dictionary address, by the transmitter, for eviction purposes such that the new data chunk is not stale;
   evicting stale entries from the index by the receiver;
   entering the new data chunk into the dictionary at the calculated dictionary address, wherein the transmitter deterministically calculates the same dictionary address such that the dictionary address is entered into the index without requiring the receiver to communicate the dictionary address to the transmitter;
   updating the dictionary to reflect that the new data chunk is not stale for eviction purposes;
   when the input queue contains a second entry that only includes an address of a second chunk, updating the dictionary to reflect that that second chunk has been recently used and is not stale for eviction purposes; and
   outputting the new data chunk to the second application.

10. The method of claim 9, further comprising, when the second entry from the input queue only includes an address, outputting the second chunk, which is stored at the address in the dictionary, to the second application.

11. The method of claim 9, further comprising receiving a data transport from the transmitter over a transport that provides guaranteed packet ordering.

12. The method of claim 9, further comprising evicting the stale chunks and/or stale addresses from the dictionary and/or the index according to a predetermined eviction strategy.

13. The method of claim 9, further comprising synchronizing the index with the dictionary by deterministically determining the dictionary address of the new data chunk at both the transmitter and the receiver.

14. The method of claim 13, wherein the dictionary address determined by the transmitter and the receiver is computed using the same inputs and the same algorithm at both the transmitter and the receiver.

15. The method of claim 14, wherein a data chunk considered for transmission by the transmitter is known to the receiver when the dictionary address is present in the index.

16. The method of claim 9, further comprising de-duplicating the data by only sending the dictionary address when the data chunk is known to the receiver.

* * * * *